May 9, 1961 R. A. MUNSE 2,983,778
BATTERY CLIP
Filed Jan. 26, 1959 3 Sheets-Sheet 1

INVENTOR.
ROBERT A. MUNSE
BY
Malcolm W. Fraser
ATTORNEY

May 9, 1961 R. A. MUNSE 2,983,778
BATTERY CLIP

Filed Jan. 26, 1959 3 Sheets-Sheet 2

INVENTOR.
ROBERT A. MUNSE
BY
Malcolm W. Fraser
ATTORNEY

May 9, 1961 R. A. MUNSE 2,983,778
BATTERY CLIP

Filed Jan. 26, 1959 3 Sheets-Sheet 3

INVENTOR.
ROBERT A. MUNSE
BY
*Malcolm W. Fraser*
ATTORNEY

United States Patent Office 2,983,778
Patented May 9, 1961

2,983,778
BATTERY CLIP

Robert A. Munse, Perrysburg, Ohio, assignor to Prestole Corporation, Toledo, Ohio, a corporation of Michigan Filed Jan. 26, 1959, Ser. No. 788,911

6 Claims. (Cl. 136—173)

This invention relates to sheet metal fasteners, but particularly to a fastener for yieldably clamping a plurality of relatively small dry-cell batteries and establishing electrical contact in series between the several batteries, such for example as used in transistor radios, and also to an improved method of fabricating and assembling same.

An object is to produce a new and improved battery clip from sheet metal which can be conveniently mounted on a supporting panel and after so mounted, parts are severed in such manner that the several batteries are properly connected in series, thereby greatly reducing the time and effort required in assembling the clip to the supporting panel in the proper manner and providing a simple and inexpensive fastener which efficiently and reliably achieves the purpose in a fool-proof manner.

Other objects and advantages of the invention will hereinafter appear and for purposes of illustration but not of limitation, an embodiment of the invention is shown on the accompanying drawings, in which Figure 1 is a top perspective view of the battery clip and panel in assembled relation;

Figure 1:
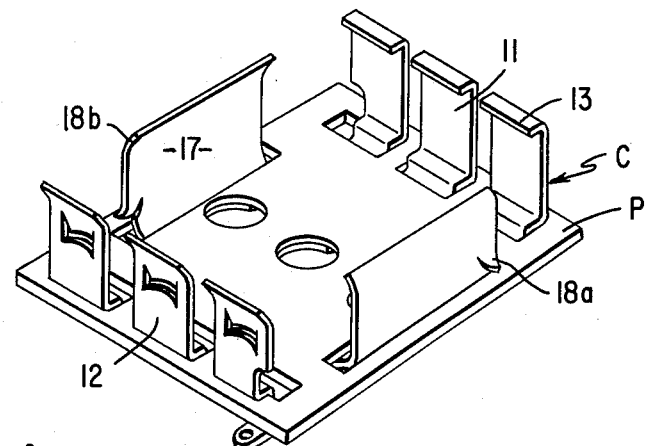

The illustrated embodiment of the invention comprises a flat supporting panel which may be of Masonite or other suitable electrical insulating material, the same being indicated at P and being provided with a series of holes $x$ at one side and $y$ at the opposite side, these holes corresponding in position and number. Intermediate the holes $x$ and $y$ at opposite ends of the panel P are elongate slots $e$ and between the two slots $e$ is a series of round holes $h$, one being provided for each pair of holes $x$ and $y$.

The sheet metal clip C which is a unitary structure preferably formed of spring metal has at one side a plurality of integral upstanding arms 11, there being three in this instance. At the opposite side of the clip is a series of upstanding arms 12, an arm 11 being opposite and corresponding to an arm 12. The clip has a flat body 10 at substantially right angles to the arms 11 and 12, there being notches between adjacent arms, these arms extending diagonal and will be more fully described later on.

At the upper end of each of the arms 11 is an inwardly extending lip 13. On each of the arms 12 is an inwardly and downwardly extending struck-out tab 14, the upper ends of each of the arms 12 being outwardly flared as indicated at 14a. Adjacent the lower end of each of the arms 11 and 12 is a snap shoulder 15.

Figure 2:
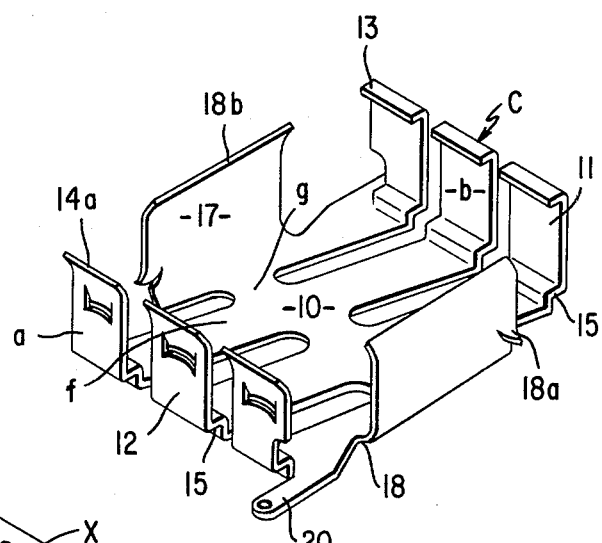
Figure 2 is a top perspective view of the battery clip in its original condition and before the parts are severed one from another.
Figure 3:
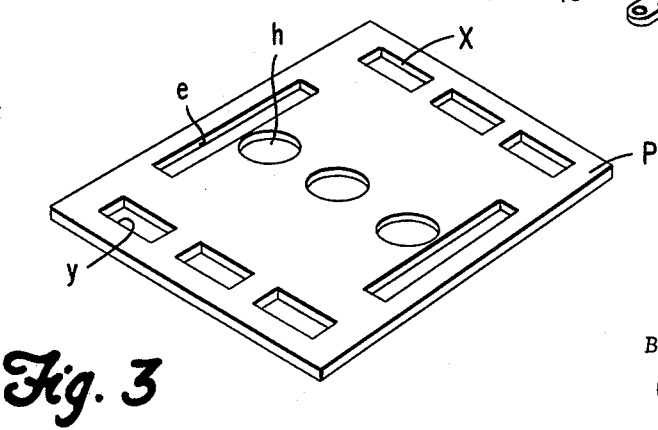
Figure 3 is a top plan view of the panel to which the battery clip is applied.

At opposite ends of the body are integral upwardly extending elongate tongues 17 and each tongue has near its lower end a snap shoulder 18. It will be seen that the clip in the form shown in Figure 2 is inserted through the respective holes in the panel P, the arms 11 extending through the holes $x$, the arms 12 through the holes $y$ respectively and the tongues 17 extending respectively through the slots $e$. The shoulders 15 and 18 above described snap over the edges of the respective openings, substantially as indicated on Figure 1. Prongs 18a on each of the tongues 17 engage the top surface of the panel P and assist in holding the clip on the panel.

The interrupted diagonal slots above mentioned are such that for example an arm $a$ constituting one of the three arms 12 is connected by a base strip $f$ to an arm $b$ which is a central arm of the series of arms 11. One of the end arms of the series 11 is integrally connected to the adjacent end tongue 17. Similarly an outer arm 12 on the opposite end of that series is integral with the other end tongue 17. By severing the bridge portions $g$ which integrally connect adjacent base strips and the base strips to the end tongue 17, then the several fasteners become separate and independent from each other. The bridge portions $g$ are centrally disposed. The severing is achieved readily after the clip has been mounted in the supporting panel P because each of these bridge portions $g$ is disposed directly beneath one of the holes $h$ in the supporting panel.

Figure 5:
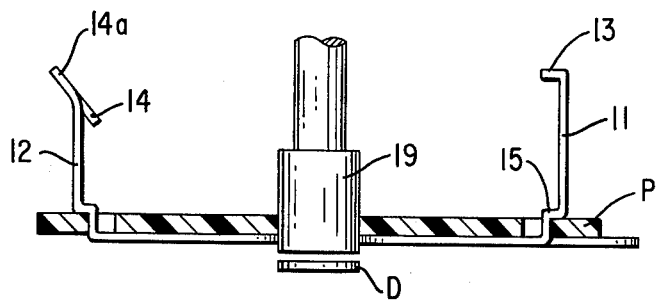
Figure 5 is a transverse sectional view showing the manner in which portions of the clip are punched out after the clip is mounted on the panel, thereby to provide the separate and independent arms for the series of batteries.

After the clip C is in place, the bridge portions $g$ are quickly and easily punched out. This may be achieved simultaneously by punches 19 entering each of the holes $h$ at the same time and, as indicated on Figure 5, cutting out a disc D which is sufficient to sever the connections or bridge portions $g$. As a result, the arms $a$ and $b$ and base strip $f$ is separated from the adjacent tongue 17 and its arm 13, and also is separated from the arms and base strip on the opposite side. Also the opposite tongue 17 and its arm constituting one of the series of arms 12 is severed from adjacent parts.

Figure 4:
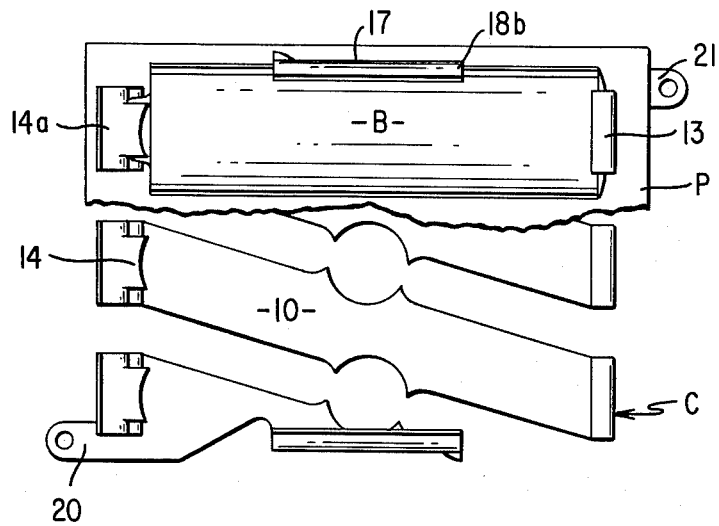
Figure 4 is a fragmentary top plan view of the clip and supporting panel, part of the panel being broken away to show the clip arms severed from each other and showing one of the dry-cell batteries in position of use.

As a consequence of this arrangement and particularly as indicated on Figure 4, three batteries may be inserted, one indicated at B being shown on Figure 4 connecting the opposite arms 11 and 12 at one end of the series. Thus, a terminal arm 20 which is integral with one of the end tongues 17 may provide one terminal for the series of batteries and the terminal 21 adjacent the other end tongue 17 provides the opposite terminal for the series of batteries. As a consequence the several batteries are connected together in series and although such an assembly may be used in numerous places, it is particularly adapted for use in transistor radios.

Figure 6:
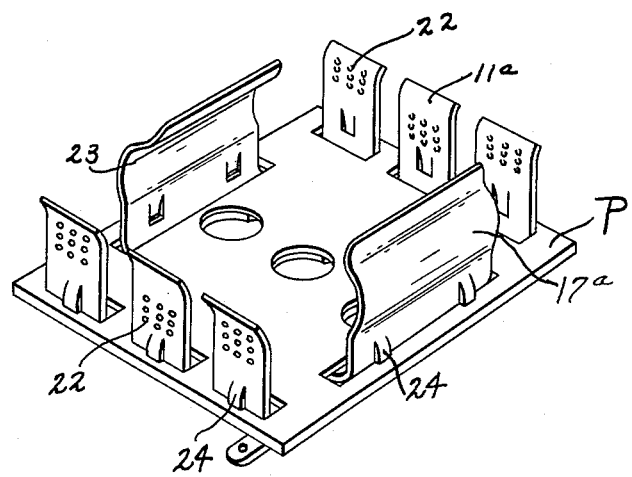
Figure 6 is a perspective view of an alternate form of battery clip.
Figure 7:
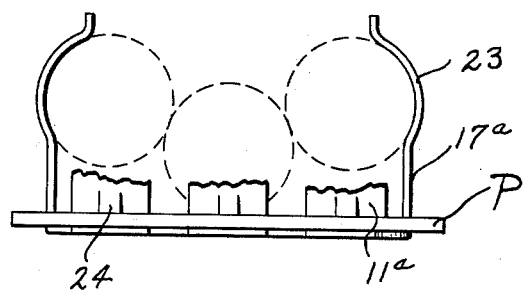
Figure 7 is a fragmentary side elevation of the clip shown in Figure 6, showing by broken lines the arrangement of the battery cells.

The cells are mounted in horizontal parallel alignment in the clip according to Figures 1 to 5. However in some instances it is desirable for the cells to be disposed in an offset manner with one cell out of alignment with the others. For coping with that situation the clip as shown in Figures 6 and 7 is designed. It is similar to the above clip except that the upstanding arms 11a are each formed with a group of inwardly extending nubbins or roughened surfaces 22 to impinge against an adjacent end of a respective cell for holding it in place. The arms 11a at the outer ends have the nubbins 22 adjacent the upper end portions whereas the intermediate arms 11a have the nubbins disposed closer to the panel P. This enables the cells to be arranged in an off-set manner as shown by the broken lines in Figure 7.

It will also be observed that the upper ends of the arms 11a are outwardly curved to facilitate the application of the cells, these curved surfaces acting as cams for resiliently flexing the arms when the cells are forced in place. The end tongues 17a have outwardly curved surfaces 23 contoured to fit the adjacent battery cells and retain them in the upper or off-set positions shown on Figure 7.

Instead of the arms 11a and tongues 17a being shouldered as indicated on Figures 1 to 5, they may be formed as in Figures 6 and 7 with struck-out fingers 24, which after passing through the respective holes in the supporting panel P, snap out to the positions shown to engage the upper surface of the panel and retain the clip in assembled relation.

The above arrangement is important not only from a manufacturing standpoint enabling the several battery clips to be manufactured at one time as a unit, but also enabling the clip to be quickly and conveniently mounted in position of use upon the supporting panel P. This reduces the assembly time quite substantially. It is but a simple matter to punch out the three discs D separating the several arms from each other after the clip has been mounted on the panel.

Numerous changes may be made in details of construction, arrangement and choice of materials without departing from the spirit of the invention, especially as defined in the appended claims.

What I claim is:

1. A sheet metal battery clip blank comprising a flat base member having sides and ends, a plurality of adjacent pairs of oppositely disposed arms projecting upwardly from the opposite sides of said base member, said base member having diagonal slots partially severing the base member into diagonal elements connecting an arm of one pair to the opposed arm of an adjacent pair, said slots leaving portions of the base member interconnecting adjacent diagonal elements, and terminals connected to the opposite ends of said base member whereby severance of said interconnecting portions provides a series connection between adjacent batteries when mounted between said pairs of oppositely disposed arms.

2. In combination with a sheet metal battery clip blank as defined in claim 1 a supporting panel of insulating material substantially coextensive with said base member and having at least one slot positioned to receive an upstanding arm of said blank.

3. In combination with a sheet metal battery clip blank as defined in claim 1 a supporting panel of insulating material substantially coextensive with said base member and having at least one slot positioned to receive an upstanding arm of said blank and having apertures therethrough substantially coextensive with said interconnecting portions.

4. A sheet metal battery clip blank comprising a flat base member having sides and ends, a plurality of adjacent pairs of oppositely disposed battery clamping arms projecting upwardly from the opposite sides of said base member, said base member having diagonal slots partially severing the base member into diagonal elements connecting an arm of one pair to the opposed arm of an adjacent pair, said slots leaving portions of the base member interconnecting adjacent diagonal elements, terminals connected to the opposite ends of said base member, and upwardly projecting arms on the opposite ends of said base whereby severance of said interconnecting portions provides a series connection between adjacent batteries when mounted between said pairs of oppositely disposed arms.

5. In combination with a sheet metal battery clip blank as defined in claim 4 a supporting panel of insulating material substantially coextensive with said base member and having at least one slot positioned to receive an upstanding arm of said blank.

6. In combination with a sheet metal battery clip blank as defined in claim 4 a supporting panel of insulating material substantially coextensive with said base member and having at least one slot positioned to receive an upstanding arm of said blank and having apertures therethrough substantially coextensive with said interconnecting portions.

References Cited in the file of this patent

UNITED STATES PATENTS

| 1,377,126 | Haefele | May 3, 1921 |

FOREIGN PATENTS

| 229,413 | Great Britain | Feb. 26, 1925 |
| 250,375 | Great Britain | Apr. 15, 1926 |
| 372,937 | Germany | Apr. 5, 1923 |